United States Patent
Hwang et al.

(10) Patent No.: US 8,672,802 B2
(45) Date of Patent: Mar. 18, 2014

(54) FLYWHEEL OF ENGINE

(71) Applicant: Hyundai Motor Company, Seoul (KR)

(72) Inventors: Jae Woong Hwang, Yongin-si (KR); Yong Wook Jin, Suwon-si (KR); Wan Soo Oh, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/667,466

(22) Filed: Nov. 2, 2012

(65) Prior Publication Data
US 2013/0260953 A1 Oct. 3, 2013

(30) Foreign Application Priority Data
Mar. 27, 2012 (KR) .......... 10-2012-0030891

(51) Int. Cl.
*F16H 57/08* (2006.01)
(52) U.S. Cl.
USPC .......... 475/347; 74/574.4
(58) Field of Classification Search
CPC ............ F16F 15/31; F16F 15/30
USPC .......... 192/70.17; 475/347; 74/574.4
See application file for complete search history.

(56) References Cited

U.S. PATENT DOCUMENTS

| | | | |
|---|---|---|---|
| 4,422,535 A | 12/1983 | Ling | |
| 4,468,207 A | 8/1984 | Yoshida | |
| 4,573,374 A * | 3/1986 | Koshimo et al. | 464/68.41 |
| 5,551,928 A | 9/1996 | Sudau | |
| 5,570,615 A | 11/1996 | Westphal et al. | |
| 5,720,248 A | 2/1998 | Crofts | |
| 5,766,109 A * | 6/1998 | Sudau | 475/347 |
| 5,836,216 A | 11/1998 | Sudau et al. | |
| 7,261,667 B2 | 8/2007 | Berger | |

FOREIGN PATENT DOCUMENTS

| | | |
|---|---|---|
| JP | 55-169723 U | 12/1980 |
| JP | 2000-130508 A | 5/2000 |
| JP | 2010-164125 A | 7/2010 |
| KR | 10-2006-0130145 A | 12/2006 |

* cited by examiner

*Primary Examiner* — Dirk Wright
(74) *Attorney, Agent, or Firm* — Morgan, Lewis & Bockius LLP

(57) ABSTRACT

A flywheel apparatus of an engine may include a primary wheel that receives a rotational force from the engine and has an integral ring gear, a secondary wheel that has a sun gear disposed coaxially with the ring gear, a carrier to which each rotary shaft of a plurality of planetary gears may be connected, the planetary gears being engaged between the integral ring gear and the sun gear, and a damping member elastically engaging between the carrier and the secondary wheel and providing an elastic force to the carrier during relative rotation between the carrier and the secondary wheel.

9 Claims, 3 Drawing Sheets

FLYWHEEL OF ENGINE

CROSS-REFERENCE TO RELATED APPLICATION

The present application claims priority to Korean Patent Application No. 10-2012-0030891 filed on Mar. 27, 2012, the entire contents of which is incorporated herein for all purposes by this reference.

BACKGROUND OF THE INVENTION

1. Field of the Invention

The present disclosure relates to a flywheel of an engine. More particularly, it relates to the structure of a flywheel that reduces torsional vibration due to a change in torque generated in an engine.

2. Description of Related Art

An engine rotates a crankshaft, using power generated in the explosion stroke and the explosion stroke is not continuous so that torsional vibration is generated in the crankshaft by the continual power stroke and the rotational vibration is not preferable for continuously driving a vehicle. Therefore, the crankshaft is equipped with a flywheel that supplies relatively large rotational inertia to attenuate or reduce rotational vibration due to the operation of the engine.

In the related art, although a DMF (Dual Mass Flywheel) has been developed and used to supplement detects of an SMF (Single Mass Flywheel) made of a single mass, engines are developed to be compact and provided with high output in recent years by reducing the number of cylinders as less as possible and mounting a supercharger so that torsional vibration due to the engine output further increases, and accordingly, it is difficult to sufficiently reduce vibration, even using the DMF.

As described above, when the torsional vibration due to the engine is not appropriately reduced, torsional vibration due to resonance is generated in the driving system including a transmission connected to the engine, which causes rattling and booming noise in the transmission.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a flywheel of an engine that is designed to be able to more effectively reduce and attenuate torsional vibration due to engine output that gradually increases and achieve more calm and stable riding comfort in a vehicle by preventing rattling and booming noise by preventing torsional vibration and resonance in a transmission connected to an engine.

In a aspect of the present invention, a flywheel apparatus of an engine may include a primary wheel that receives a rotational force from the engine and may have an integral ring gear, a secondary wheel that may have a sun gear disposed coaxially with the ring gear, a carrier to which each rotary shaft of a plurality of planetary gears is connected, the planetary gears being engaged between the integral ring gear and the sun gear, and a damping member elastically engaging between the carrier and the secondary wheel and providing an elastic force to the carrier during relative rotation between the carrier and the secondary wheel.

The sun gear is connected to the secondary wheel through a one-way clutch, and the one-way clutch restricts rotation opposite to a direction of the rotational force from the engine which is inputted to the primary wheel.

The carrier may include a base plate to which the each rotary shaft of the planetary gears is fixed and pressing protrusions protruding radially outward from the base plate to press an end of the damping member, and the secondary wheel is shaped to guide the damping member in an arc shape while surrounding the base plate and the pressing protrusions of the carrier and may have an integral center shaft to which the sun gear is fitted.

Runners to which the damping member is engaged, are slidably mounted between the carrier and the secondary wheel, and wherein the pressing protrusions are disposed between the runners.

Stoppers are fixed on an inner circumference of the secondary wheel and supports are fixed to an outer circumference of the runners, and the damper spring is disposed between the supports and the stoppers.

The carrier may include an inner hole formed to the base plate, the inner hole being fitted around the center shaft of the secondary wheel.

The inner hole of the base plate is fitted around the center shaft of the secondary wheel by a support spring.

In another aspect of the present invention, a flywheel apparatus of an engine, comprising a planetary gear set that may include one rotary element receiving a rotational force from the engine and other two rotary elements receiving a rotational force from the one rotary element and elastically supported in relative rotation therebetween, wherein at least two of the one rotary element and the other two rotary elements of the planetary gear set are a primary wheel and a secondary wheel, respectively.

The planetary gear set is implemented such that a ring gear connected to a crankshaft to receive the rotational force from the engine is the primary wheel and a sun gear is the secondary wheel and draws out power, wherein a carrier is engaged between the ring gear and the sun gear to generate relative rotation with respect to the sun gear, and wherein a damping member elastically supporting the relative rotation is disposed between the carrier and the sun gear.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
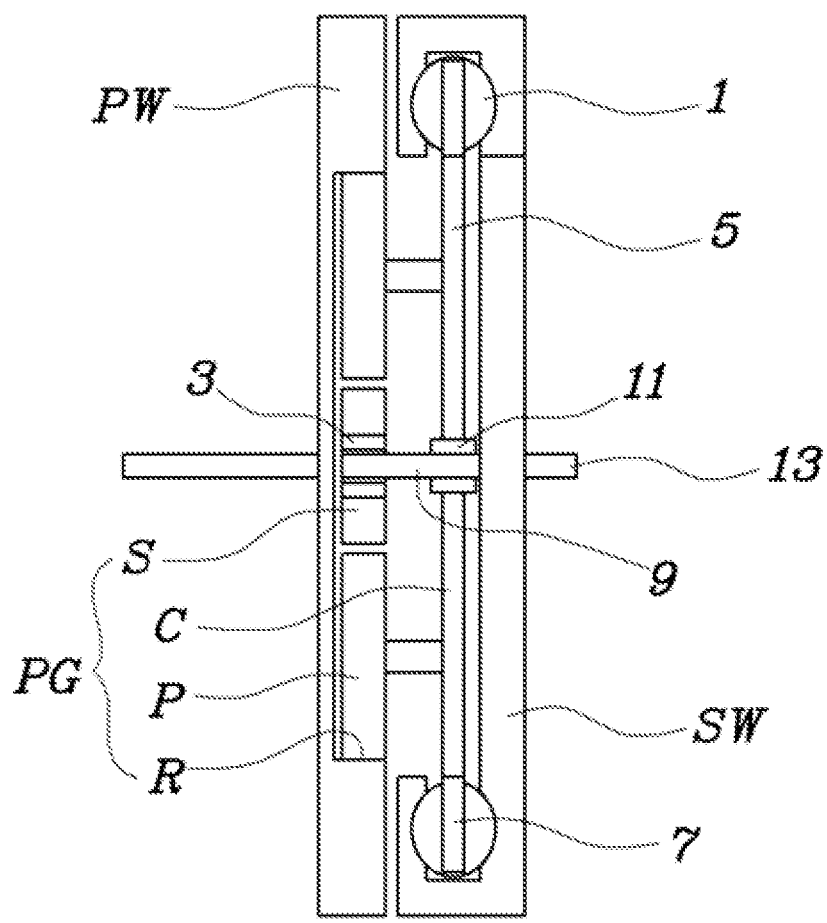
FIG. 1 is a view showing the structure of a flywheel of an engine according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 1 to 4, a flywheel according to an exemplary embodiment of the present invention includes, a rotary element that receives rotational force from an engine. a planetary gear set PG including other two rotary elements receiving a rotational force from the rotary element and elastically supported in relative rotation, in which at least the two rotary elements of the planetary gear set PG function as a primary wheel PW and a secondary wheel SW, respectively, which generate a rotational inertia force so that torsional vibration inputted from the engine is attenuated by elastic relative motion of the two rotary elements that are elastically supported.

That is, a flywheel according to embodiments of the present invention includes, a primary wheel PW that receives a rotational force from an engine and has an integral ring gear R. a secondary wheel SW that has a sun gear S disposed coaxially with the ring gear R. a carrier C connecting rotary shafts of a plurality of planetary gears P tooth-engaged between the ring gear R and the sun gear S. a damping spring 1 that provides an elastic force during relative rotation between the carrier C and the secondary wheel SW.

Figure 4:
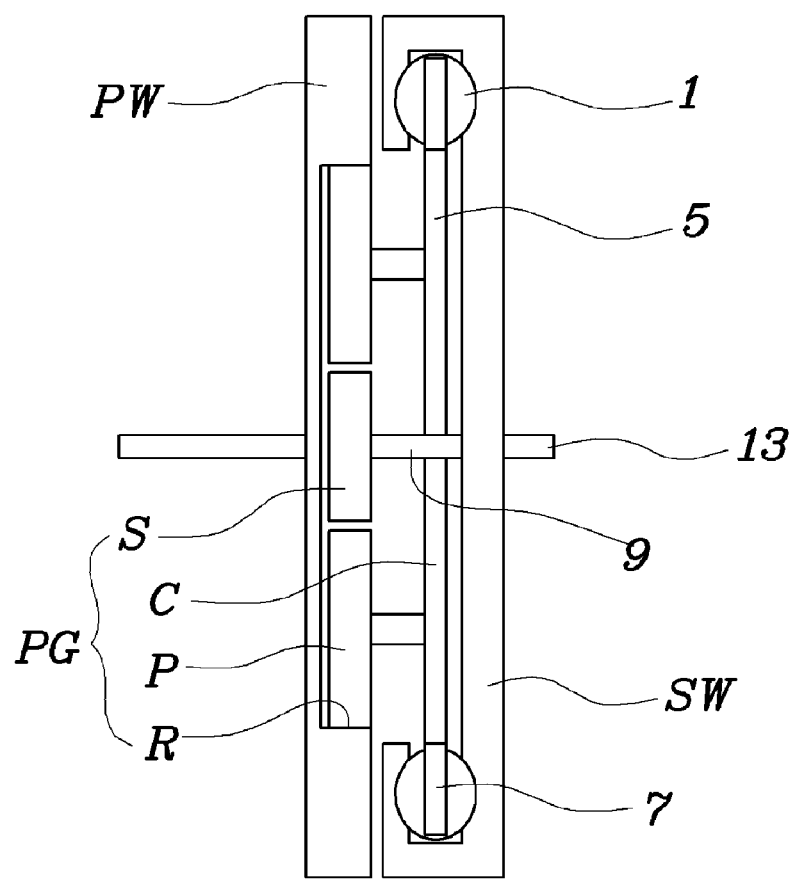
FIG. 4 is a view showing an exemplary embodiment of the present invention different from FIG. 1.

In the exemplary embodiment shown in FIG. 1, the sun gear S is connected to the secondary wheel SW through a one-way clutch 3, the one-way clutch 3 restricts rotation opposite to the direction of the rotary force from the engine which is inputted to the primary wheel PW, while in the exemplary embodiment shown in FIG. 4, the sun gear S is integrally formed with the secondary wheel SW, so that, in practice, the exemplary embodiments of FIGS. 1 and 4 shows that the difference when the sun gear S is connected with the secondary wheel SW through the one-way clutch 3 or directly.

Figure 2:
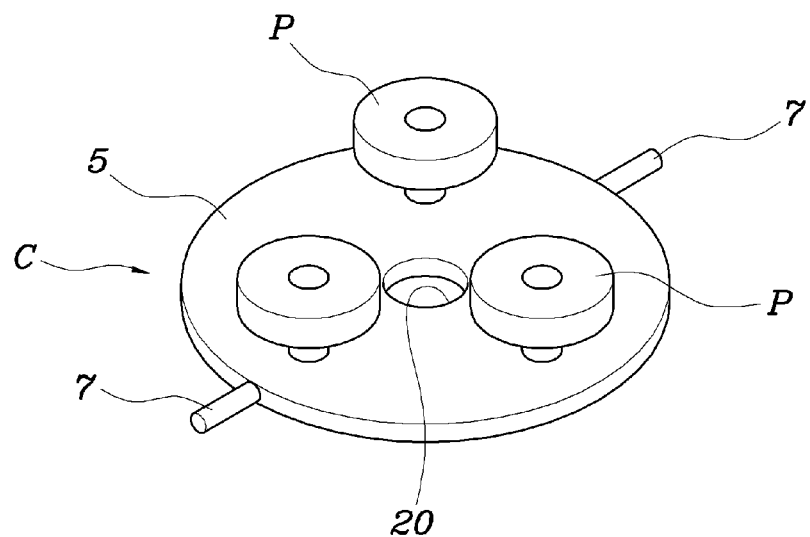
FIG. 2 is a view showing a carrier shown in FIG. 1.

The carrier C, as shown in FIG. 2, includes a base plate 5 where the rotary shafts of the planetary gears P are fixed and pressing protrusions 7 protruding radially outward from the base plate 5 and press the ends of the damping spring 1.

Figure 3:
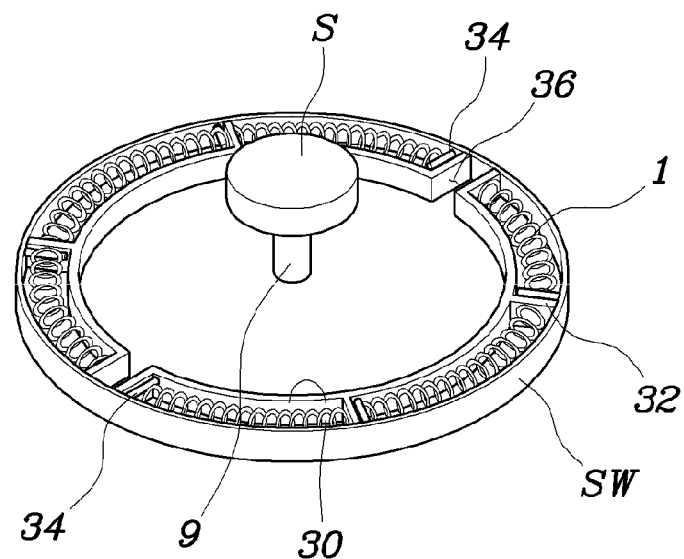
FIG. 3 is a view showing the structure of a secondary wheel equipped with a damping spring shown in FIG. 1.

The secondary wheel SW is shaped to guide the damping spring 1 in an arc shape while surrounding the base plate 5 and the pressing protrusions 7 of the carrier C and has an integral center shaft 9 where the sun gear S is fitted, and FIG. 3 shows the secondary wheel SW with the surface cut in order to show an example of arranging the damping spring 1.

In an exemplary embodiment of the present invention, runners 30 are slidably mounted in the secondary wheel SW. Stoppers 34 are formed on inner circumference of the secondary wheel SW. A plurality of supports 32 is formed to outer circumference of the runners 30. Between the runners 30, a receiving gap 36 is formed to receive the pressing protrusions 7. The damper spring 1 is disposed between the support 32 and the stopper 34.

In the exemplary embodiment shown in FIG. 1, the carrier C is rotatably supported with the inner hole 20 of the base plate 5 fitted around the center shaft 9 of the secondary wheel SW by a support spring 11 so that a rotation-support structure that is more stable than the exemplary embodiment shown in FIG. 4 that is not equipped with the support bearing 11 is achieved.

According to the exemplary embodiments of the present invention described above, power is supplied to the primary wheel PW and the ring gear R of the primary wheel PW rotates the carrier C and the sun gear S while rotating so that the power is outputted through the secondary wheel SW connected with the sun gear S.

Figure 5:
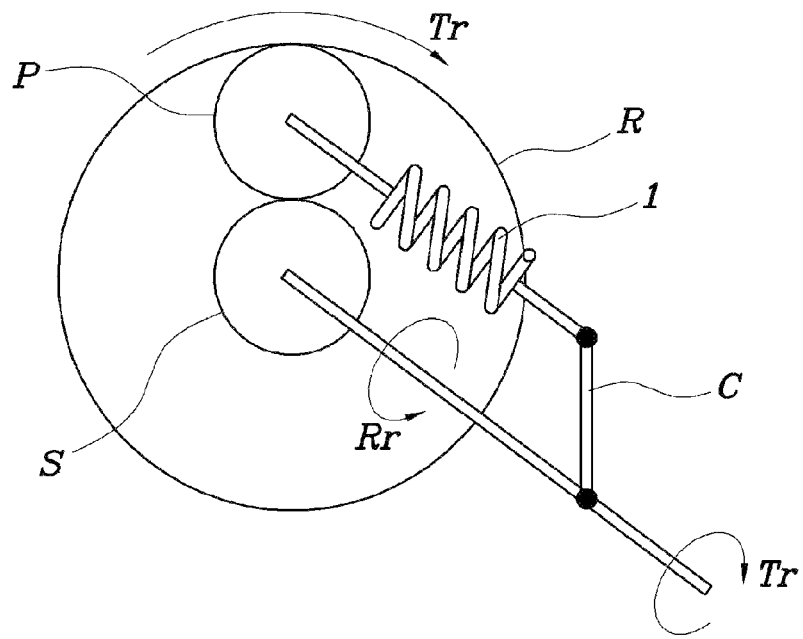
FIG. 5 is a view illustrating the operational principle of the present invention.

Referring to FIG. 5, as the ring gear R is rotated by power Tr inputted from the engine, the carrier C and the sun gear S rotates together in the same direction (clockwise) so that the power Tr is outputted through an output shaft 13 connected to the secondary wheel SW.

Torsional vibration due to the power inputted from the engine is attenuated by the relative motion between the carrier C and the sun gear S, and the damping spring 1 elastically supporting the carrier C and the sun gear S, the planetary gears P of the carrier C rotates the carrier C clockwise while being rotated and revolved by the clockwise rotation of the ring gear R so that the sun gear S generates a reaction force Rr that causes counterclockwise rotation, and as a result, relative rotation is generated in the opposite directions between the sun gear S and the carrier C and the relative rotation is elastically supported by the damping spring 1 so that the torsional vibration from the engine is attenuated by the relative motion between the sun gear S and the carrier C and the elastic deformation of the damping spring 1.

The stiffness of the damping spring 1 shows an effect as if stiffness reduced in comparison to the original stiffness of the damping spring 1 by the gear ratio of the planetary gears P is provided.

That is, as the rotational force of the ring gear R is reduced at the carrier C by the gar ration of the carrier C and applied to the damping spring, an effect, as if the damping spring 1 extends/retracts with a small displacement as much as the product of the gear ratio with respect to a relatively large rotational displacement between the primary wheel PW integrally formed with the ring gear R and the secondary wheel SW integrally formed with the sun gear S and provides relatively small stiffness, is achieved.

The flywheel according to the exemplary embodiments of the present invention can be considered as a dual mass flywheel in which relative rotation between the primary wheel PW and the secondary wheel SW is elastically supported, and the lower the stiffness, the more the elastic body supporting the relative rotation between two masses can attenuate vibration in the dual mass flywheel. however, the relative rotational range allowable between the two masses is structurally limited, such that it is difficult to reduce the stiffness of the elastic body without a limit. According to an exemplary embodiment of the present invention, however, the displacement of the damping spring 1 is made relatively small by the gear ratio of the planetary gear set PG while a large relative rotational displacement is ensured between the primary wheel PW and the secondary wheel SW, such that an effect that the damping spring 1 provides relatively small stiffness, and thus a vibration attenuation performance of the dual mass flywheel is maximized.

Meanwhile, according to the exemplary embodiment shown in FIG. 1, unlike the exemplary embodiment shown in FIG. 4, the sun gear S is prevented from rotating counterclockwise, but allowed to rotate clockwise with respect to the center shaft 9 of the secondary wheel SW by the one-way clutch 3 such that the input torsional vibration is structurally limited by the one-way clutch in one direction and is attenuated by the damping spring 1 in the other direction.

Figure 6:
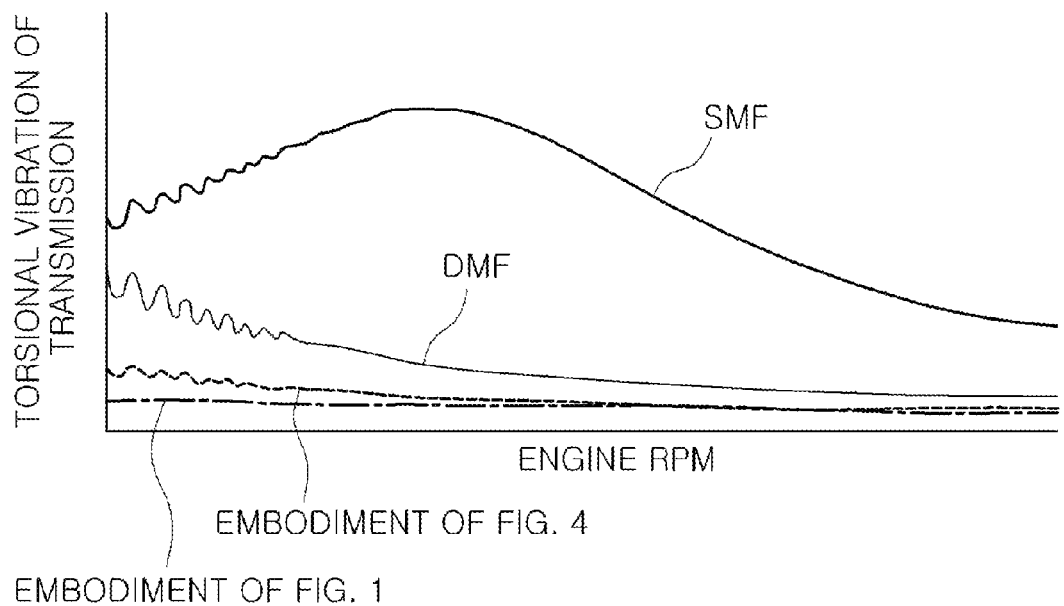
FIG. 6 is a graph illustrating the effect of the present invention.

For reference, FIG. 6 shows the result of analyzing the effect of the present invention from a computer simulation, that is, shows the result of comparing the degrees of attenuation of torsional vibration of a transmission when engine output accompanied with the same torsional vibration is inputted and the transmission is equipped with an SMF, DMF, the exemplary embodiment of the present invention shown in FIG. 4, and the exemplary embodiment of the present invention shown in FIG. 1, and it can be seen from the FIG. that the exemplary embodiments of the present invention show a vibration attenuation effect better than a common DMF of the related art and the effect increases when the one-way clutch is mounted.

According to an exemplary embodiment of the present invention, it is possible to more effectively reduce and attenuate torsional vibration due to engine output and achieve more calm and stable riding comfort in a vehicle by preventing rattling and booming noise by preventing torsional vibration and resonance in a transmission connected to an engine.

For convenience in explanation and accurate definition in the appended claims, the terms "upper", "lower", "inner" and "outer", are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A flywheel apparatus of an engine comprising:
    a primary wheel that receives a rotational force from the engine and has an integral ring gear;
    a secondary wheel that has a sun gear disposed coaxially with the ring gear;
    a carrier to which each rotary shaft of a plurality of planetary gears is connected, the planetary gears being engaged between the integral ring gear and the sun gear; and
    a damping member elastically engaging between the carrier and the secondary wheel and providing an elastic force to the carrier during relative rotation between the carrier and the secondary wheel.

2. The flywheel apparatus of claim 1, wherein the sun gear is connected to the secondary wheel through a one-way clutch, and
    the one-way clutch restricts rotation opposite to a direction of the rotational force from the engine which is inputted to the primary wheel.

3. The flywheel apparatus of claim 1, wherein the carrier includes a base plate to which the each rotary shaft of the planetary gears is fixed and pressing protrusions protruding radially outward from the base plate to press an end of the damping member, and
    the secondary wheel is shaped to guide the damping member in an arc shape while surrounding the base plate and the pressing protrusions of the carrier and has an integral center shaft to which the sun gear is fitted.

4. The flywheel apparatus of claim 3, wherein runners to which the damping member is engaged, are slidably mounted between the carrier and the secondary wheel, and wherein the pressing protrusions are disposed between the runners.

5. The flywheel apparatus of claim 4, wherein stoppers are fixed on an inner circumference of the secondary wheel and supports are fixed to an outer circumference of the runners, and the damper spring is disposed between the supports and the stoppers.

6. The flywheel apparatus of claim 3, wherein the carrier includes an inner hole formed to the base plate, the inner hole being fitted around the center shaft of the secondary wheel.

7. The flywheel apparatus of claim 6, wherein the inner hole of the base plate is fitted around the center shaft of the secondary wheel by a support spring.

8. A flywheel apparatus of an engine, comprising a planetary gear set that includes one rotary element receiving a rotational force from the engine and other two rotary elements receiving a rotational force from the one rotary element and elastically supported in relative rotation therebetween,
    wherein at least two of the one rotary element and the other two rotary elements of the planetary gear set are a primary wheel and a secondary wheel, respectively.

9. The flywheel apparatus of claim 8,
    wherein the planetary gear set is implemented such that a ring gear connected to a crankshaft to receive the rotational force from the engine is the primary wheel and a sun gear is the secondary wheel and draws out power,
    wherein a carrier is engaged between the ring gear and the sun gear to generate relative rotation with respect to the sun gear, and wherein a damping member elastically supporting the relative rotation is disposed between the carrier and the sun gear.

* * * * *